United States Patent [19]

Saman

[11] Patent Number: 5,586,490

[45] Date of Patent: Dec. 24, 1996

[54] COOKING DEVICE

[76] Inventor: Shukri T. Saman, 4712 David Dr., Kenner, La. 70065

[21] Appl. No.: 497,389

[22] Filed: Jun. 30, 1995

[51] Int. Cl.[6] ................................................. A47J 37/04
[52] U.S. Cl. ........................ 99/421 R; 99/419; 99/421 H
[58] Field of Search ............................. 99/421 R, 421 V, 99/419, 421 M, 421 P, 421 TP, 421 HH, 421 H; 126/41 A

[56] References Cited

U.S. PATENT DOCUMENTS

| Re. 23,662 | 5/1953 | Larkin | 99/421 H |
|---|---|---|---|
| 1,612,252 | 12/1926 | Beverly . | |
| 1,728,738 | 9/1929 | Rasmussen et al. . | |
| 1,817,351 | 8/1931 | Cookson | 99/419 |
| 2,179,646 | 11/1939 | Spartalis | 99/421 V |
| 2,477,183 | 7/1949 | Humensky | 99/421 |
| 2,517,360 | 8/1950 | Singer | 99/443 |
| 2,608,149 | 8/1952 | Ellis | 99/421 |
| 2,618,563 | 11/1952 | Barnhard | 99/419 |
| 2,722,882 | 11/1955 | Wilson | 99/421 |
| 2,900,897 | 8/1959 | Fisher | 99/340 |
| 4,043,260 | 8/1977 | LaPour et al. | 99/421 |
| 4,211,159 | 7/1980 | Coatu | 99/421 V |
| 4,508,028 | 4/1985 | Booker, Jr. | 99/421 |
| 4,781,109 | 11/1988 | Wiebe, Jr. et al. | 99/419 |

FOREIGN PATENT DOCUMENTS

| 0646109 | 3/1960 | Italy | 99/421 V |
|---|---|---|---|

*Primary Examiner*—David Scherbel
*Assistant Examiner*—Reginald L. Alexander
*Attorney, Agent, or Firm*—Joseph N. Breaux

[57] ABSTRACT

A cooking device comprising: an insulated housing defining a cooking cavity therein having a front opening; a radiant heat source disposed within the cooking cavity and positioned adjacent a rear wall of the housing; a rotating vertical support having a first end, centered in the housing; a plurality of rigid elongated skewers aligned along the length of the vertical support and disposed horizontally therethrough for holding various items of food to be cooked, the food items travelling in a circular path about the longitudinal axis of the rotating vertical support; and a motorized mechanism detachably connected to the first end of the vertical support for rotating the vertical support about its longitudinal axis.

12 Claims, 6 Drawing Sheets

COOKING DEVICE

BACKGROUND OF THE INVENTION

The present invention relates to devices for cooking and more particularly to devices for cooking that rotates the items to be cooked.

DESCRIPTION OF THE PRIOR ART

While cooking devices are generally well known there has always been a problem of constructing an oven in such a way as to conserve fuel and provide visibility and ready access to the oven for removing the meat and for cleaning the oven. Such devices have heretofore been very complicated from a mechanical standpoint and have been capable of accommodating relatively small amounts of meat or other food items. In addition food items which require different cooking times or temperature ranges cannot be cooked at the same time. In devices which have rotisserie elements the quantity of food that may be cooked at any one time is severely limited. Further, food items are often difficult to maintain on the spits or to secure in a manner so that the item does not rotate on the spit.

It would be a benefit, therefore, to have a cooking device which has vertically aligned radiant cooking elements to accommodate cleaning of the device. It would be a further benefit to have a cooking device which has a drip pan for containing the juices excreted by the food items being cooked. It would be an additional benefit to have a cooking device which has a plurality of horizontal skewers aligned vertically along a vertical support which rotate about the longitudinal axis of the vertical support. It would also be a benefit to have a vertical support which is removable to aide in cleaning and in removing of the cooked items. It would be a yet further benefit to have planar trays which are removably attachable to the vertical support and seatable atop the skewers to allow for the cooking of soft or small food items such as hamburger meat or shrimp.

SUMMARY OF THE INVENTION

It is thus an object of the invention to provide a cooking device that has a rotating cooking rack including a removable vertical support having a plurality of horizontal skewers aligned along its length and disposed therethrough.

It is a further object of the invention to provide a cooking device that has an offset vertically aligned radiant heat source.

It is a still further object of the invention to provide a cooking device that has rigid tray members removably attachable about the vertical support and seatable atop the skewers.

It is a still further object of the invention to provide a cooking device that has removable skewers to allow for the placement of large food items.

Still another object of the invention is to provide a cooking device that has a drip pan located below the rotating food rack for containing the juices of the food items being cooked.

Accordingly, a cooking device of the type having a heated housing and a rotating food rack is provided. The cooking device comprises: an insulated housing defining a cooking cavity therein having a front opening; a radiant heat source disposed within the cooking cavity and positioned adjacent a rear wall of the housing; a rotating vertical support having a first end, centered in the housing; a plurality of rigid elongated skewers aligned along the length of the vertical support and disposed horizontally therethrough for holding various items of food to be cooked, the food items travelling in a circular path about the longitudinal axis of the rotating vertical support; and a motorized mechanism detachably connected to the first end of the vertical support for rotating the vertical support about its longitudinal axis.

The housing may be constructed of stainless steel, aluminum, ceramic, heat resistant glass or other material known in the art for construction of ovens. The housing may be insulated to maintain heat within the oven and to prevent the outer surface of the oven from becoming hot to the touch.

The housing may be rectangular, square or tubular in shape. Preferably, the housing is rectangular having its long side oriented vertically. The housing is closed on the bottom and the top. The housing may be open on its sides. The housing may be closed on three sides. The housing may be closed on three sides and have a front opening. Preferably, the housing is enclosed on three sides and has a front opening. More preferably, a door is hingedly disposed within the front opening for maintaining heat within the housing when the door is closed and for conveniently accessing the cooking cavity when the door is opened.

The door may be constructed of the same material as the housing. The door may comprise a single member for sealing covering the front opening. The door may comprise two door elements hingedly connected to opposite sides of the front opening and lockably connectable to each other along longitudinal edges when the door elements are in the closed position. Preferably, the door has a transparent heat resistant portion, such as a glass window, for viewing the cooking cavity.

The radiant heat source is vertically aligned along the rear portion of the housing and suitably spaced from the ends of the skewers to allow for rotation of the skewers within the cooking cavity. The radiant heat source is oriented vertically along a rear portion of the housing to provide constant heat front vertically along the length of the vertical support and for ease of cleaning of the interior of the housing. The radiant heat source may be an electrically excited element such as those found in a conventional oven. The radiant heat source may be open fire burners fueled by natural gas such as propane. Preferably, the radiant heat source has a mechanism for adjusting the heat emitted therefrom.

The rotating vertical support is an elongated rod formed of stainless steel or other material known in the art to resist heat. The vertical support has a first end formed to detachably connect to a motorized mechanism for rotating the vertical support about its longitudinal axis. The vertical support is centered in the cooking cavity of the housing. Preferably, the vertical support has apertures formed therethrough along its length for disposing horizontal skewers. More preferably, adjacent apertures are aligned in offsetting orientations.

The skewers are elongated rods horizontally disposed through the vertical support. The skewers may be fixed attached to the vertical support. The skewers may be removably attached to the vertical support. Preferably, the skewers have a first and second end conically tapered to a point for penetrating and thus hanging food therefrom.

The cooking device may have rigid planar trays removably detachable about the vertical support. The trays may be seatable atop the skewers. The trays may have openings formed therethrough for draining the juices of food items being cooked thereon.

In a preferred embodiment a circular drip pan having raised sidewalls rests on the floor portion of the cooking cavity below the skewers and trays for containing the drippings from the food being cooked.

A motorized mechanism is connected to the first end of the vertical support for rotating the vertical support about its longitudinal axis. The motorized mechanism may be an electric motor having a drive shaft extending therefrom. Preferably, the motorized mechanism operates at two revolutions per minute. More preferably, the motorized mechanism is adjustable through a range of revolutions per minute.

In use of a preferred embodiment of the cooking device food items including various cuts of meat and vegetables are hung from the horizontal skewers. The meat and vegetables are arranged on the skewers according to the heat and time required for cooking the item. Fast cooking items or items requiring less heat would be placed on the skewers adjacent the vertical support thus removing them from the heat source. Slower cooking items and items which require higher heat may be place on the skewers adjacent the ends and thus be closer to the heat. In addition, trays may be added to the vertical support for cooking items such as hamburgers. With the heating elements on and the vertical support rotating the odds of burning the food is reduced. When items of food are done they may be individually removed or a skewer holding the item may be removed. When the cooking is completed the vertical support and drip pan may be removed for easy cleaning of the cooking cavity of the housing.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE PREFERRED EMBODIMENT(S)

Figure 1:
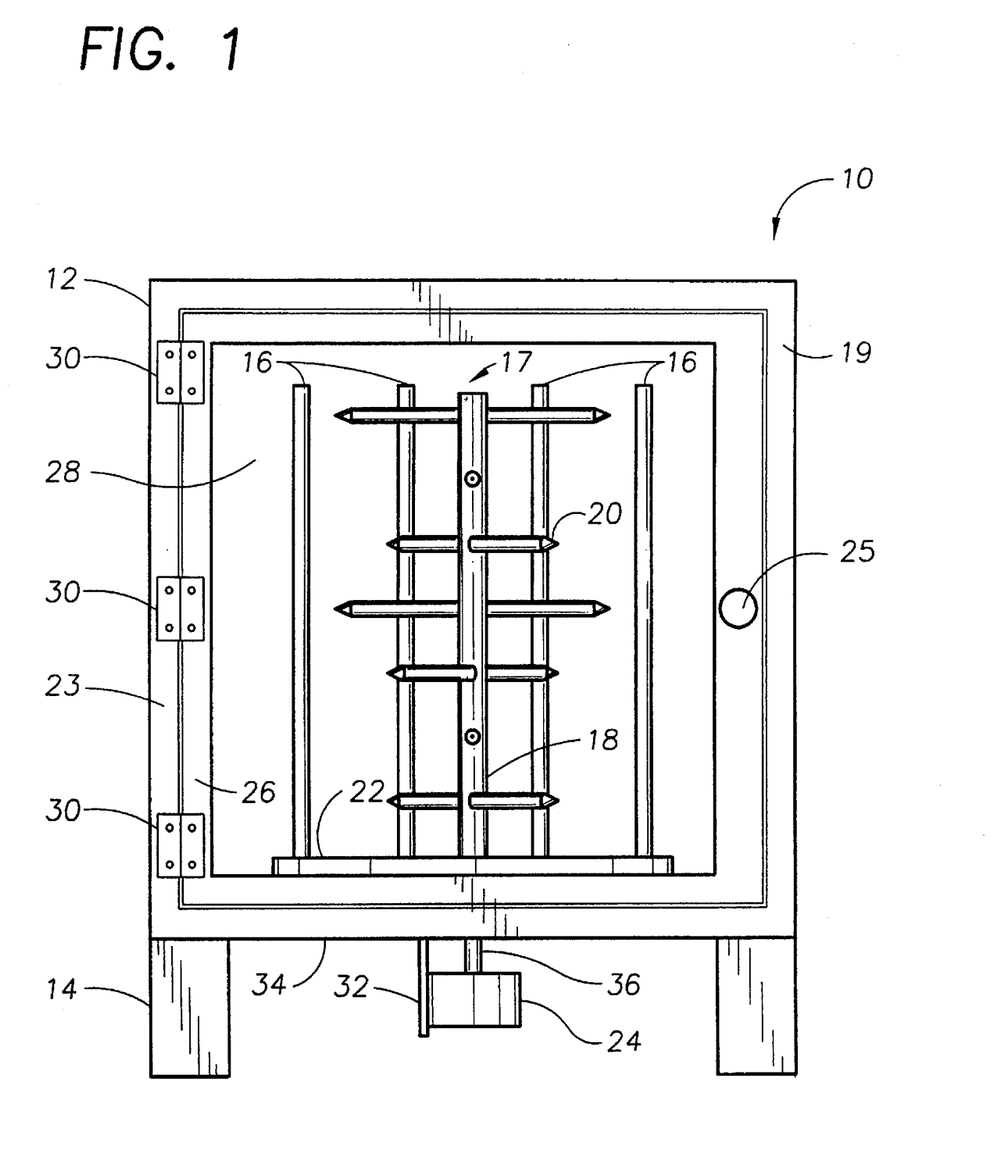
FIG. 1 is a front view of an exemplary embodiment of the cooking device of the present invention.

FIG. 1 is a front view of an exemplary embodiment of the cooking device of the present invention generally designated by the numeral 10. Cooking device 10 includes a housing unit 12 mounted on legs 14, a radiant heat source 16, a rotating food rack 17 having a vertical support 18 and horizontal skewers 20, a drip pan 22 and an electric motor 24.

Housing unit 12 is rectangular and constructed of insulated metallic sheeting. A door 26 having a heat resistant glass pane 28 is connected to the front lip 23 of housing 12 by hinges 30 and is disposable in front opening 19 of housing 12. Lock 25 has a rotatable arm (not shown) which rotates behind front lip 23 maintaining door 26 in a closed position.

Electric motor 24 is secured to a vertical bracket 32 which is attached to the underside of housing floor 34. Drive shaft 36 is disposed through floor 34 and is removably attached to vertical support 18. Motor 24 is designed to rotate food rack 17 at a rate of two revolutions per minute.

Figure 2:
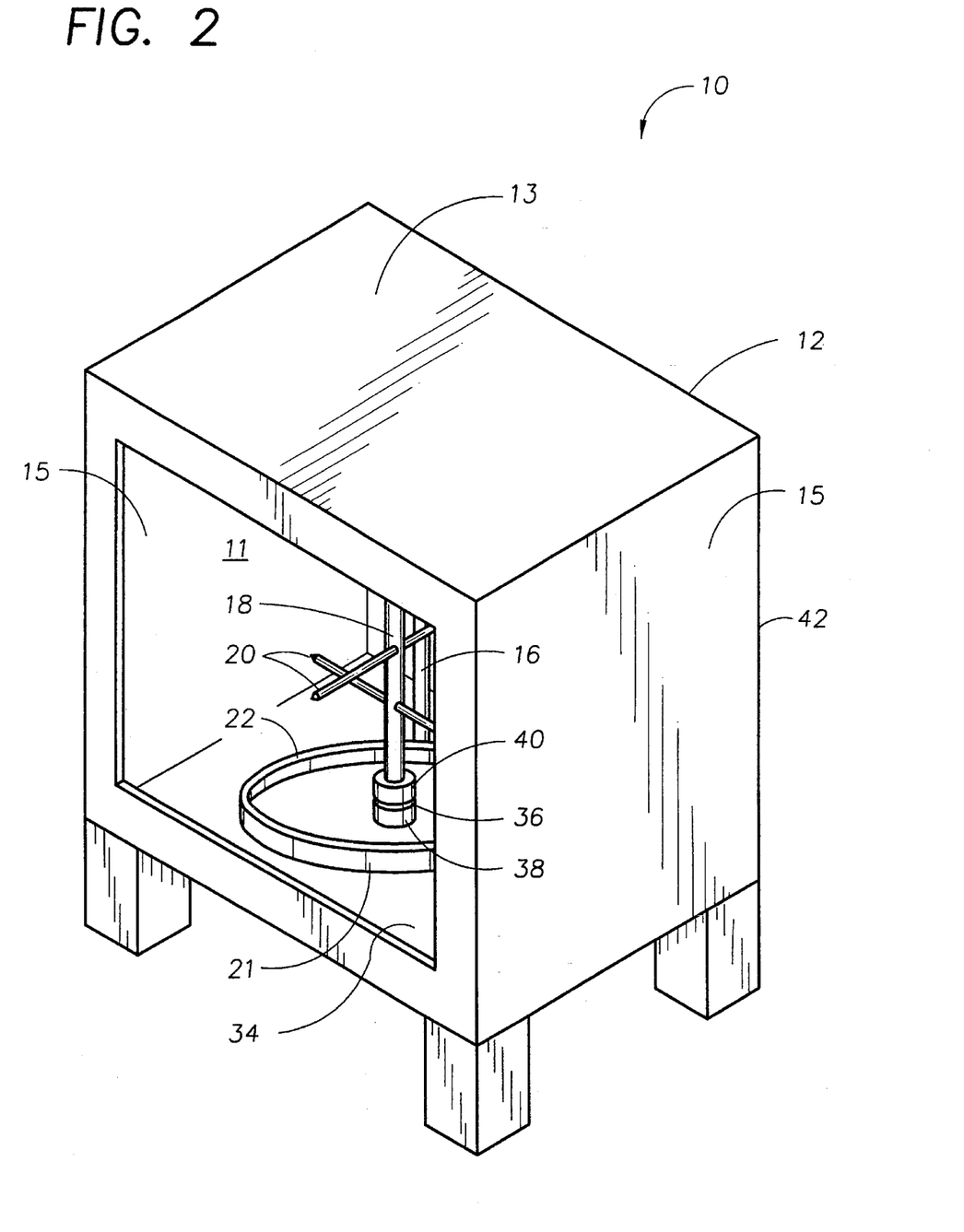
FIG. 2 is an isometric view of the cooking device with the door removed.

FIG. 2 is an isometric view of cooking device 10 with door 26 removed. The figure shows housing 12 having a floor 34, top 13, sidewalls 15, and rear wall 42 defining a cooking cavity 11. Drip pan 22 has a raised sidewall 21 and rests on floor 34. Drip pan 22 is constructed of stainless steel and is eleven inches in diameter. Drive shaft 36 passes through a hole (not shown) in floor 34 and through a sleeve 38 centered in drip pan 22. Vertical support 18 is removably seated in a socket 40 which is attached to the terminal end (not shown) of drive shaft 36.

Radiant heat source 16 is an electrically operated and temperature adjustable heating element as found in a conventional oven. Heat source 16 is suitably spaced from vertical support 18 and skewers 20 and is vertically oriented along the interior surface of rear wall 42 of housing 12.

Figure 3:
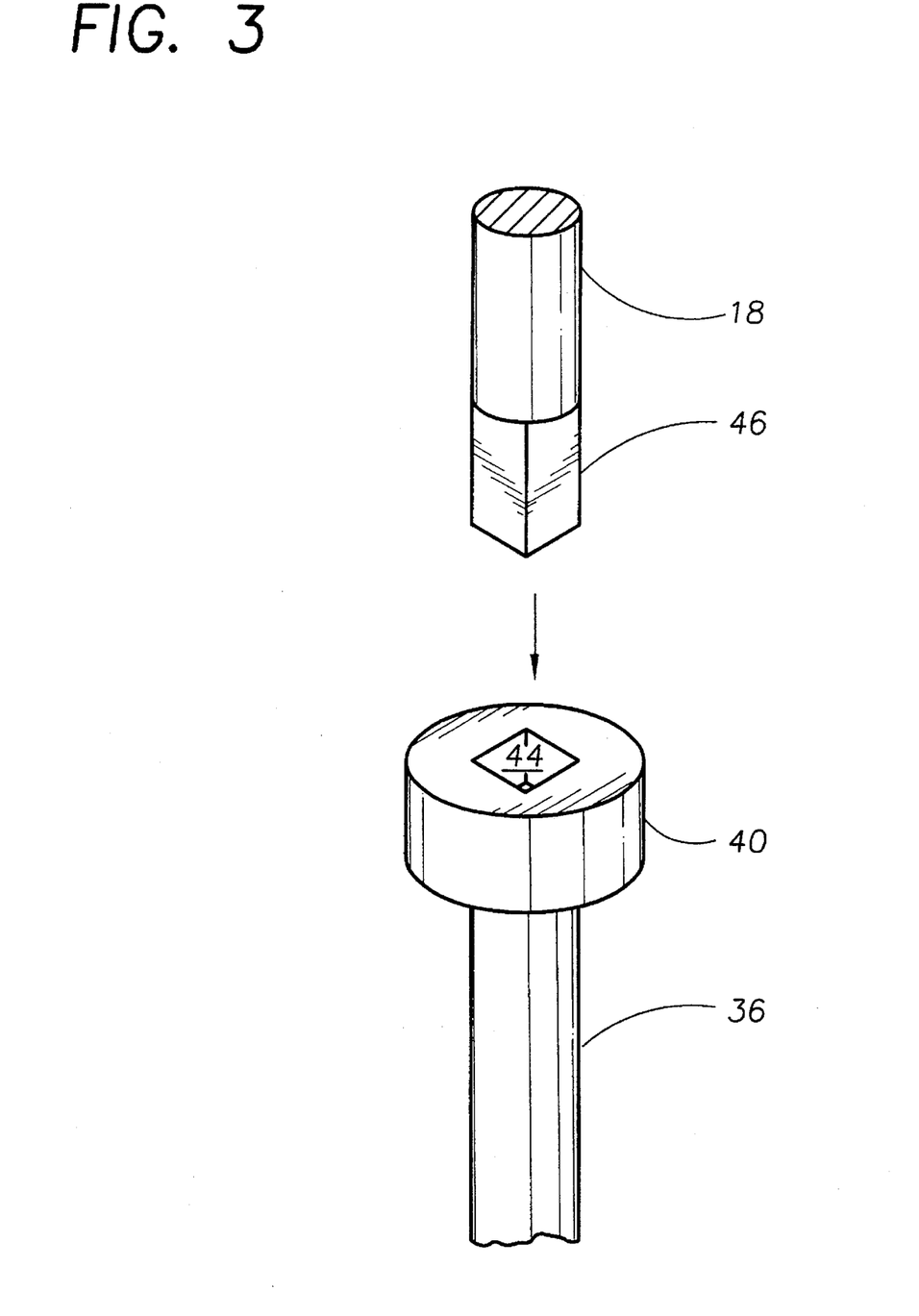
FIG. 3 is an isolation view of the socket and vertical support connection.

FIG. 3 is an isolation view of socket 40 and vertical support 18. Socket 40 is attached to drive shaft 36 by welding and defines a rectangular receiver 44 therein. Vertical support 18 has a rectangular formed end 46 which is removably seatable in receiver 44.

Figure 4:
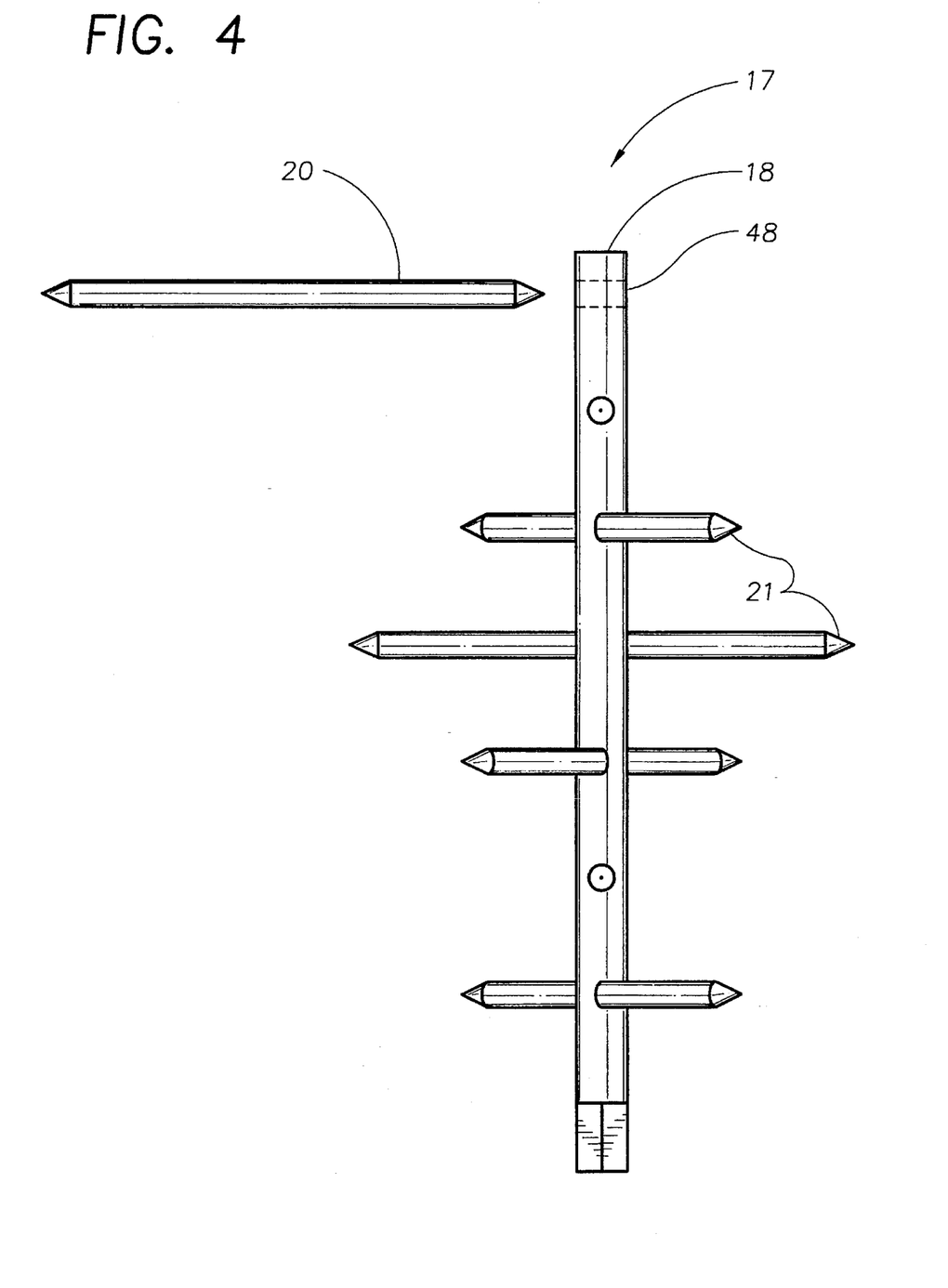
FIG. 4 is a side view of the rotating food rack.

FIG. 4 is a side view of rotating food rack 17. Vertical support 18 is a circular stainless steel rod twenty inches in length and three-quarters inch in diameter having a rectangular formed end 46. Vertical support 18 forms horizontal skewer pathways 48 therethrough for frictionally passing skewers 20. Skewer pathways 48 are evenly spaced along vertical support 18 and oriented such that no two adjacent pathways 48 are oriented in the same direction. Skewers 20 are elongated stainless steel rods one-quarter inch in diameter having tapered ends 21 for penetrating and attaching food items to skewers 20.

Figure 5:
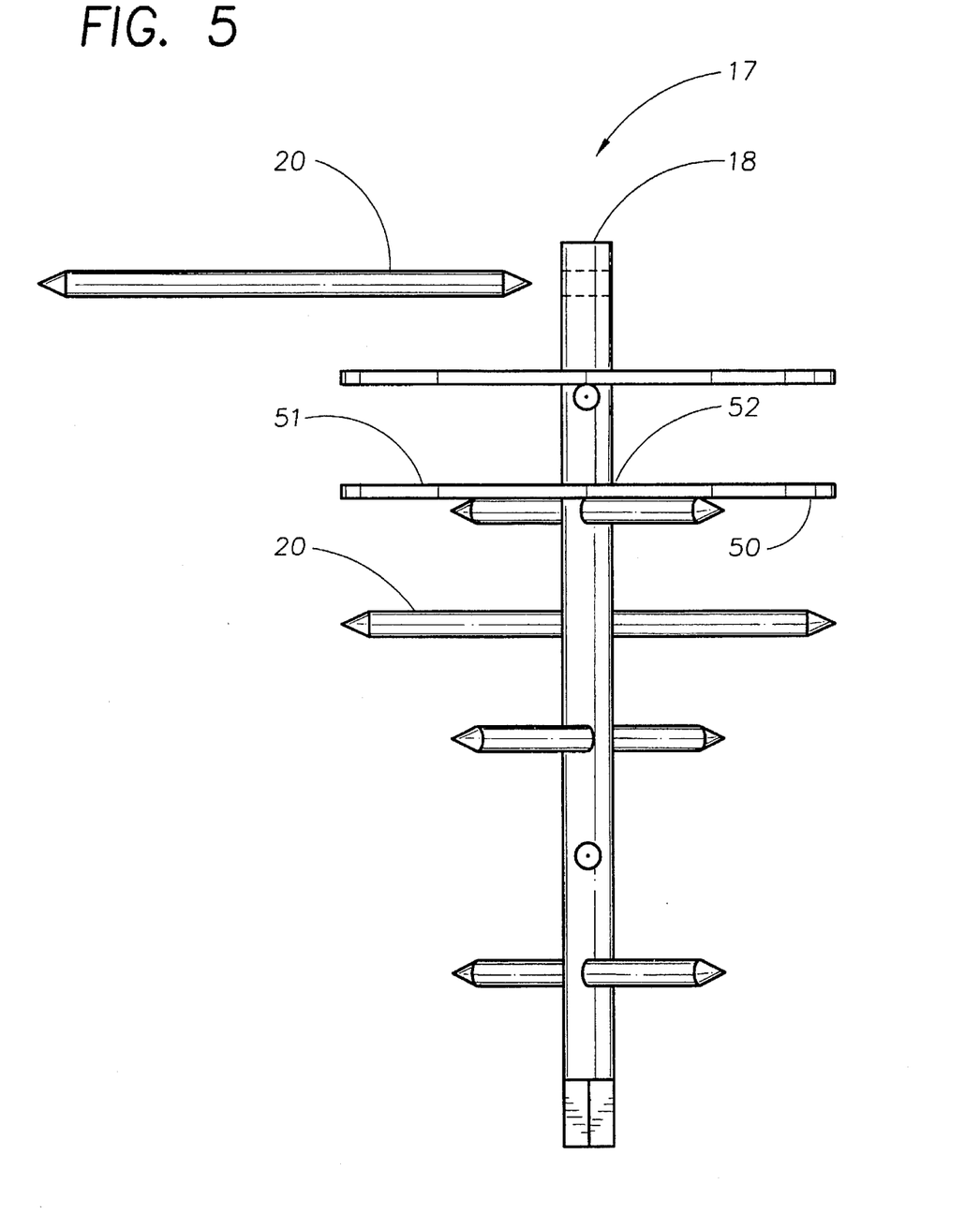
FIG. 5 is a side view of another embodiment of rotating food rack.

FIG. 5 is a side view of another embodiment of rotating food rack 17. The figure shows two trays 50 resting atop skewers 20. Trays 50 are rigid circular stainless steel sheets ten inches in diameter and having a planar surface 51 for placing items of food. Trays 50 form a centered circular aperture 52 for disposing vertical support 18. Trays 50 are attached by removing skewers 20 above the desired level for placing tray 50 and then running support 18 through aperture 52 until tray 50 rests atop skewer 20 at the chosen level.

Figure 6:
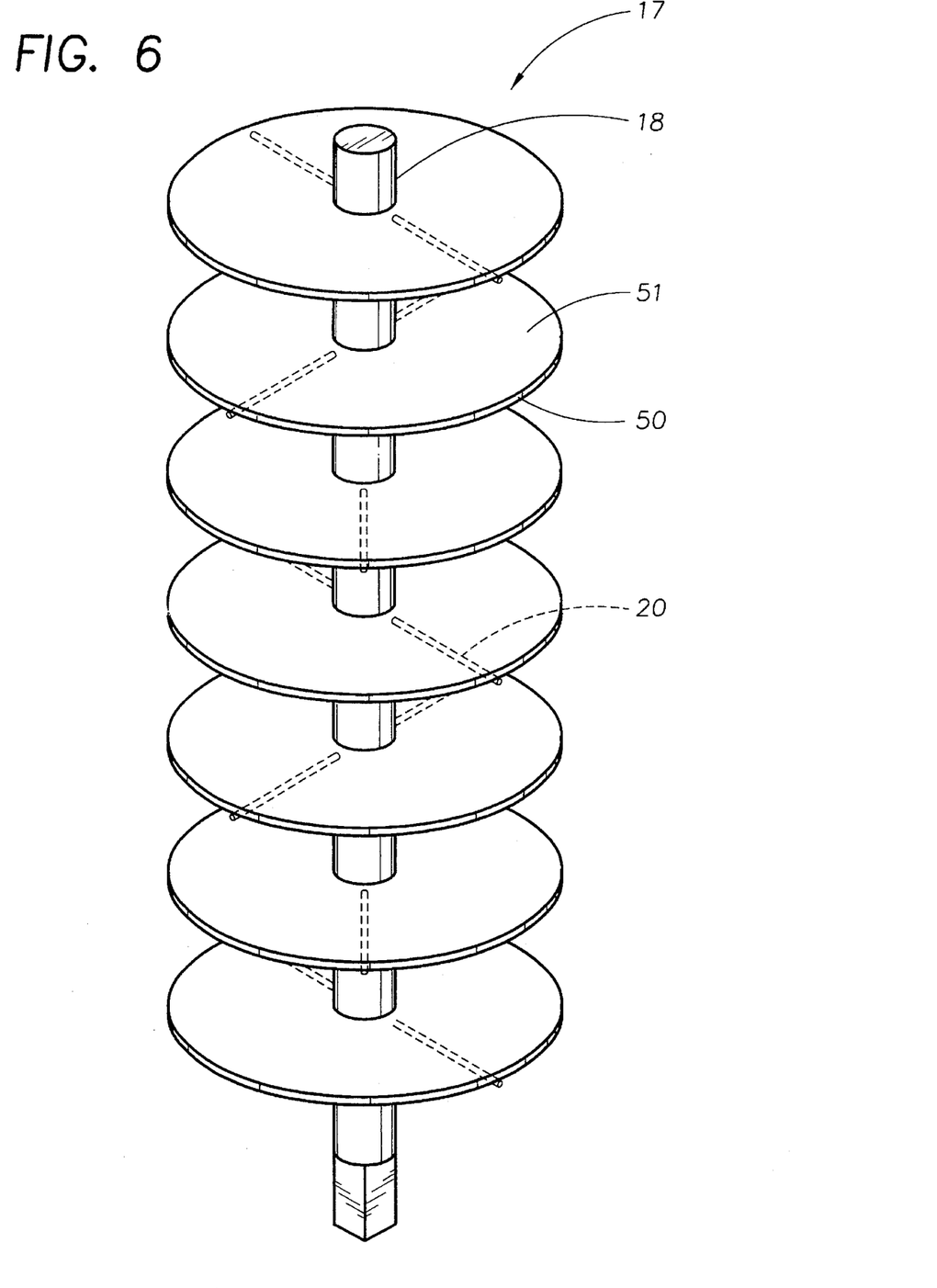
FIG. 6 is an isometric side view of another embodiment of rotating food rack.

FIG. 6 is an isometric side view of another embodiment of rotating food rack 17. The figure shows food rack 17 comprising seven trays 50 for placing items of food to be cooked. Each tray 50 disposes vertical support 18 and rests atop a skewer 20 indicated by the dotted lines.

It can be seen from the preceding description that a device for cooking which has a rotating cooking rack including a removable vertical support having a plurality of horizontal skewers aligned along its length and disposed therethrough, an offset vertically aligned radiant heat source, rigid tray members removably attachable about the vertical support and seatable atop the skewers, and removable skewers to allow placement of large food items has been provided.

It is noted that the embodiment of the cooking device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A cooking device comprising:

an insulated housing defining a cooking cavity therein having a front opening;

a radiant heat source disposed within the cooking cavity and positioned adjacent a rear wall of said housing;

a rotating vertical support having a first end, centered in said housing;

a plurality of rigid elongated skewers aligned along the length of said vertical support and disposed horizontally therethrough for holding various items of food to be cooked, the food items traveling in a circular path about the longitudinal axis of said rotating vertical support said skewers having a first and second end conically tapered to a point; and mechanized means detachably connected to said first end of said vertical support for rotating said vertical support about its longitudinal axis.

2. A cooking device comprising:

an insulated housing defining a cooking cavity therein having a front opening;

a radiant heat source disposed within the cooking cavity and positioned adjacent a rear wall of said housing;

a rotating vertical support having a first end, centered in said housing;

a plurality of rigid elongated skewers aligned along the length of said vertical support and disposed horizontally therethrough for holding various items of food to be cooked, the food items traveling in a circular path about the longitudinal axis of said rotating vertical support;

a plurality of circular rigid planar trays removably securable about said vertical support and seatable atop said skewers; and mechanized means detachably connected to said first end of said vertical support for rotating said vertical support about its longitudinal axis.

3. A cooking device comprising:

an insulated housing defining a cooking cavity therein having a front opening;

a radiant heat source disposed within the cooking cavity and positioned adjacent a rear wall of said housing;

a rotating vertical support having a first end, centered in said housing;

a plurality of rigid elongated skewers aligned along the length of said vertical support and disposed horizontally therethrough for holding various items of food to be cooked, the food items traveling in a circular path about the longitudinal axis of said rotating vertical support;

a plurality of circular rigid planar trays removably securable about said vertical support and seatable atop said skewers; and an electric motor having a drive shaft extending therefrom having a terminal end detachably connected to said first end of said vertical support for rotating said vertical support about its longitudinal axis.

4. The cooking device of claim 3, wherein:

said skewers have a first and second end conically tapered to a point.

5. The cooking device of claim 4, wherein:

said skewers are removably disposed through said vertical support.

6. The cooking device of claim 5, further including:

a circular drip pan having raised sidewalls and forming a centered raised sleeve member placed on a floor surface of said housing; and said drive shaft being disposed through said sleeve member.

7. The cooking device of claim 6, wherein:

said electric motor rotates said vertical support at a speed not greater than two revolutions per minute.

8. A cooking device comprising:

an insulated housing defining a cooking cavity therein having a front opening;

an radiant heat source disposed within said cooking cavity and positioned adjacent a rear wall of said housing;

a rotating vertical support having a first end, centered in said housing;

a plurality of rigid elongated skewers having first and second ends conically tapered to a point being aligned along the length of said vertical support and removably disposed horizontally therethrough for holding various items of food to be cooked, the food items travelling in a circular path about the longitudinal axis of said rotating vertical support; and an electric motor having a drive shaft extending therefrom having a terminal end detachably connected to said first end of said vertical support for rotating said vertical support about its longitudinal axis.

9. The cooking device of claim 8, wherein:

said adjacent skewers are aligned in offsetting orientations.

10. The cooking device of claim 9, further including:

an insulated door hingedly disposed within said front opening of said housing and movable between an open and a closed position;

locking mechanism in connection between said door and a front lip of said housing for sealingly securing said door in said front opening when said door is in said closed position; and said insulated door including a transparent heat resistant portion for viewing said cooking cavity.

11. The cooking device of claim 10, further including:

a circular drip pan having raised sidewalls and forming a centered raised sleeve member placed on a floor surface of said housing; and said drive shaft being disposed through said sleeve member.

12. A cooking device comprising:

an insulated housing defining a cooking cavity therein having a front opening;

an insulated door hingedly disposed within said front opening of said housing and movable between an open and a closed position;

a locking mechanism in connection between said door and a front lip of said housing for sealingly securing said door in said front opening when said door is in said closed position;

said insulated door including a transparent heat resistant portion for viewing said cooking cavity;

a radiant heat source disposed within said cooking cavity and positioned adjacent a rear wall of said housing;

a rotating vertical support having a first end, centered in said housing;

a plurality of rigid elongated skewers having first and second ends conically tapered to a point being aligned along the length of said vertical support and removably disposed horizontally therethrough for holding various items of food to be cooked, the food items travelling in a circular path about the longitudinal axis of said rotating vertical support;

said adjacent skewers are aligned in offsetting orientations;

circular rigid planar trays removably securable about said vertical support and seatable atop said skewers;

an electric motor having a drive shaft extending therefrom having a terminal end detachably connected to said first end of said vertical support for rotating said vertical support about its longitudinal axis; and a circular drip pan having raised sidewalls and forming a centered raised sleeve member placed on a floor surface of said housing, said drive shaft being disposed through said sleeve member.

* * * * *